July 1, 1930. A. L. PRICE 1,769,307
TRACTION INCREASING MUD HOOK
Filed Jan. 7, 1929 2 Sheets-Sheet 1
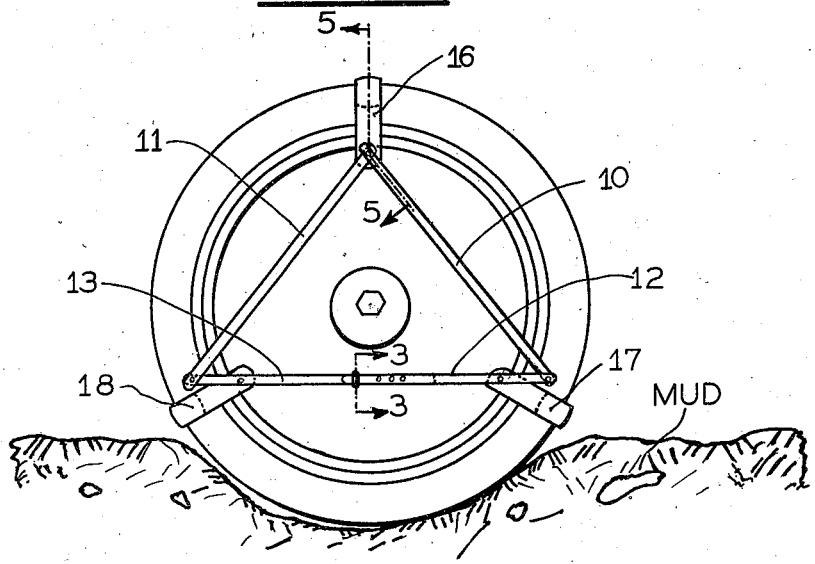
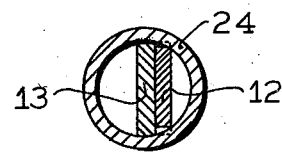
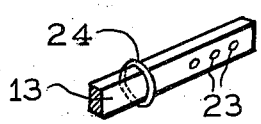
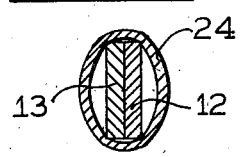
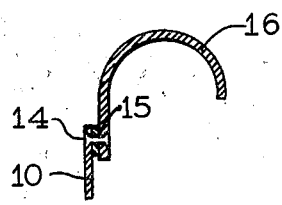
Inventor
ARTHUR L. PRICE.
By Tom B. Boman, Attorney July 1, 1930.  A. L. PRICE  1,769,307
TRACTION INCREASING MUD HOOK Filed Jan. 7, 1929  2 Sheets-Sheet 2

Inventor
ARTHUR L. PRICE.
By
Tom G. Doman.  Attorney

Patented July 1, 1930

1,769,307

UNITED STATES PATENT OFFICE

ARTHUR L. PRICE, OF TULSA, OKLAHOMA

TRACTION-INCREASING MUD HOOK

Application filed January 7, 1929. Serial No. 330,813.

This invention relates generally to an attachment for vehicle wheels whereby they will be capable of gripping the surface upon which they run, and more particularly to a quickly attachable and detachable mud or snow hook, for use on the tractive wheels of automobiles and the like, the same being collapsible, whereby, when not in use, it may be disposed within the tool box of the vehicle.

The ordinary type of automobile antiskid or 'mud' chain is deficient in that it is difficult to put the same on when the wheel is muddy or is in the mud, as the inside of the wheel must be reached in order to fasten the ends of the inner part of the chain together. Furthermore, during the application of the ordinary chains, the wheels must either be jacked up and the chains fastened thereabout or else the chains may be laid flat on the ground and, after the vehicle has been pushed so as to bring the wheels upon the chains, fastened in place. Obviously, either of the manipulations described above, is difficult to accomplish, especially when the automobile or vehicle is 'stalled' in the mud or snow.

Also, still referring to the ordinary types of chains, it is very difficult to fasten the outer sections of the chain together so that the chain will remain taut when the car is in use, as only a direct and unincreased force may be applied to fasten it in place.

Single unit chains, which are sometimes used instead of the continuous chains just described, merely encircle the rim, felloe, and tire, and consequently are easily put on in the mud. However, this type of single unit chain cannot be applied to disc wheels as the interior portion of the wheel is covered by the disc itself and hence the chain unit cannot be made to encircle the tire and its supporting means.

Also, single unit chains cannot be used on quite a number of automobiles due to their large brake drums which render the space between the outer periphery of the drum and the inner rim or felloe of the wheel insufficient to allow the chain unit to be passed therethrough. Moreover, in this particular type of anti-skid means, each unit must be applied separately and hence considerable time is required to attach and detach a sufficient number of units. Also, scratching or marring of the inner side of the rim of the wheels may be caused by the use of these encircling single unit chains.

Now, in my novel mud or snow traction or anti-skid chains or hooks, I obviate the above difficulties as will hereinafter be set forth.

In the first place I render it unnecessary to jack the car up in order to place my traction increasing mud hooks thereon, or even to move the car or vehicle. My construction, which will later be fully described, is such as to permit it to be applied by merely putting it in place against the outer face of the wheel and fastening it firmly thereby latching a single catch or hook.

This catch or hook is so positioned as to be readily accessible to the user of the chain as well as being so placed as to preclude it from being fouled by the mud and dirt in which the wheel may be revolving.

Another advantage of my invention is its adaptability. As will be noted it is universal in that it may be used with equal facility on wheels of either wood, wire or disc construction. Moreover, the triangular supporting frame holding the gripping shoes, circumscribes the hub of the wheel thereby preventing any interference therewith. My device contacts only with the tire.

The application of my traction increasing mud hook is rendered still more easy by my three point gripping arrangement whereby the mud adjacent the mired wheel will not hinder the affixation of my unit thereto.

Yet another advantage secured by my chain grippers is its collapsibility whereby it may be easily kept in the tool box or the like of the car when not in use.

My invention consists generally of three gripping shoes which conform more or less to a cross section of the tire to which they are to be applied, collapsible connecting means between these gripping shoes or units, and means for holding the collapsible means in place whereby the mud chain or hook stays firmly attached to the wheel.

For the purpose of illustrating the invention, I have shown in the accompanying drawing a typical embodiment, which, in practice, will give reliable and satisfactory results. It is, however, to be understood that this embodiment is typical only and that various instrumentalities, of which my invention consists, can be variously arranged and organized, and that the invention is not limited to the precise arrangement and organization of these instrumentalities as herein set forth.

I attain the heretofore described advantages and objects illustrated in the accompanying drawing, in which—

Fig. 1 shows a side view of an ordinary wheel with the preferred form of my invention attached thereto.

Fig. 2 is an enlarged perspective view showing the details of the connection between two of the members of the triangular shaped frame.

Fig. 3 is a section taken along the line 3—3 of Fig. 1. This view shows the locking ring in its natural position.

Fig. 4 is a sectional view similar to that shown in Fig. 3 but showing the spring ring in its distorted position.

Fig. 5 is a sectional view taken along the line 5—5 of Fig. 1. This view shows the details of the gripper or shoe.

Similar numerals refer to similar parts throughout the several views.

Figure 6:
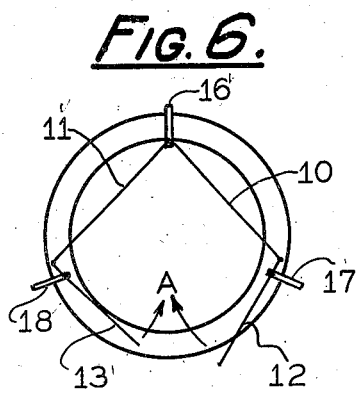
Fig. 6 is a diagrammatic sketch showing the mud hook or chain just before it has been put into operative position.

The members or strips 10, 11, 12 and 13 constitute the triangularly shaped body of my invention. These members are pivotally connected together as clearly shown in Figs. 1 and 6. Members 10 and 11 are pivoted at one end by means of a pin, 14, and this pin extends through hole, 15, in the semi-circular gripping shoe 16. See Fig. 5.

The lower ends of the members 10 and 11, referring to Fig. 1, are pivotally connected to members 12 and 13 respectively. Gripping shoes, 17, and 18, are connected near the ends of members, 12 and 13, respectively.

When it is desired to place my quickly attachable mud hook or chain upon the wheel of a vehicle, the gripping shoe, 16, is placed over the top of the wheel, and the other shoes, 17, and 18, gravitationally lie alongside the opposite sides of the wheel. Next, members or links, 12, and 13, are pushed upwardly in the direction indicated by the arrow, A, see Fig. 6, and these members are firmly held in position by means of the structure now to be described.

Member 12, has a pin, 22, protruding therefrom, said pin fitting into any of the holes, 23, bored or cored in the strip 13, and is held therein by means of a spring locking ring, 24, slidably mounted on the strip or link member, 13, and capable of being forced over the end of the member, 12, and into the groove, 25, formed therein. A similar locking means might be placed on strip, 12, if so desired or deemed necessary.

Fig. 3 shows the spring ring, 24, in its natural shape, i. e. a circle. As the spring ring, 24, is forced over both of the members, 12 and 13, it is distorted in shape as shown in Fig. 4. Thus, when the ring is forcibly slid over the member, 12, and seated in the groove, 25, it will remain fixed in that position thereby, firmly locking these two members together and holding the entire triangular frame and the depending shoes or grippers thereon, firmly in position. Thus the links, 12 and 13, are united as one.

Figure 7:
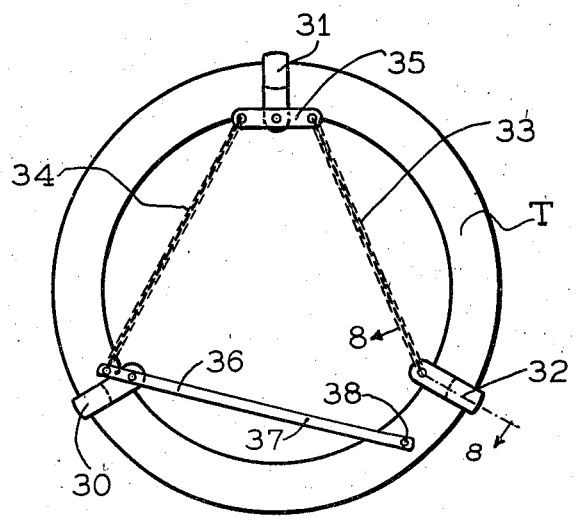
Fig. 7 is a side view of a modified form of my structure wherein chains partly replace the rigid rods or links.

Fig. 7 shows a modification of my invention in which grippers 30, 31 and 32, are fastened upon the wheel, T, by means of chains and interconnecting means therefor. A chain, 33, is fastened at one end to the gripping shoe or member, 32, and at its other end to the end of the lever or link 35. This chain tensioning equalizing lever is pivoted upon the shoe, 31, and another chain, 34, runs from the other end of the link, 35, to a lever or link, 36.

As clearly shown the lever 36, is pivoted to the shoe or gripper, 30, and has a handle portion, 37, whereby the hole, 38, may be positioned directly over the pin 39. This pin, 39, is rigidly fastened to the shoe, 32, and has a groove or indentation, 40, near its top.

Figure 8:
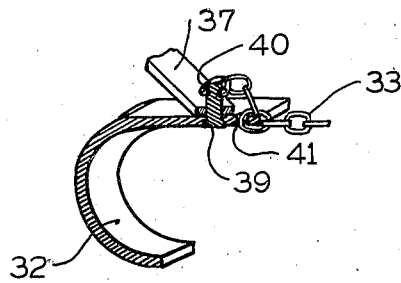
Fig. 8 is a view taken along the line 8—8 of Fig. 7, the unit being shown as locked in place.

The shoe, 32, also has a hole, 41, see Fig. 8, into which one of the links of the chain, 33, is fastened. One of the remaining or surplus links may be forced into the groove, 40, thereby holding the lever, 36, in position.

Figure 9:
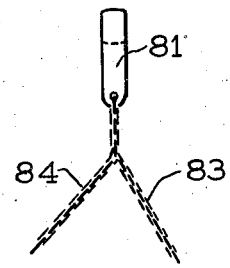
Fig. 9 is a modified form of the chain equalizing device.

Fig. 9 shows a modification of the equalizing lever system for allowing chains 83, and 84, to be under equal stress. As shown, chains 83, and 84, are joined together a short distance from their point of attachment to the shoe, 81, and this permits them to automatically seek a position of equilibrium.

Having thus revealed this invention, I claim as new and desire to secure the following combinations and elements, or equivalents thereof, by Letters Patent of the United States.

What I claim is—

An attachment for an automobile wheel consisting of three substantially semi-circular shoes adapted for contact with only the outer periphery of the tire, two members of the same length pivotally connected at one of their ends to one shoe, two other members pivoted to the free ends of the same, the other two shoes being pivotally connected to the last mentioned members a short distance inwardly from their pivot points and means connecting the last mentioned members together.

In testimony whereof I affix my signature.

ARTHUR L. PRICE.